(12) United States Patent
Laukhuff et al.

(10) Patent No.: US 9,677,287 B2
(45) Date of Patent: Jun. 13, 2017

(54) METHODS FOR ENCAPSULATING A SUBSTRATE AND PRODUCTS PRODUCED FROM SAME

(71) Applicant: Armstrong World Industries, Inc., Lancaster, PA (US)

(72) Inventors: Barbara L. Laukhuff, Mount Joy, PA (US); Lawrence C. Neeper, Stillwater, OK (US)

(73) Assignee: AFI Licensing LLC, Lancaster, PA (US)

( * ) Notice: Subject to any disclaimer, the term of this patent is extended or adjusted under 35 U.S.C. 154(b) by 384 days.

(21) Appl. No.: 14/139,498

(22) Filed: Dec. 23, 2013

(65) Prior Publication Data

US 2015/0176291 A1    Jun. 25, 2015

(51) Int. Cl.
| | |
|---|---|
| *E04F 15/16* | (2006.01) |
| *B32B 37/24* | (2006.01) |
| *B32B 17/04* | (2006.01) |
| *B32B 38/06* | (2006.01) |

(52) U.S. Cl.
CPC ............ *E04F 15/163* (2013.01); *B32B 17/04* (2013.01); *B32B 37/24* (2013.01); *B32B 38/06* (2013.01); *B32B 2037/243* (2013.01); *B32B 2305/30* (2013.01); *B32B 2309/14* (2013.01); *B32B 2315/085* (2013.01); *B32B 2471/00* (2013.01); *Y10T 428/239* (2015.01)

(58) Field of Classification Search
CPC ....... E04F 15/166; E04F 15/181; B29C 44/24
See application file for complete search history.

(56) References Cited

U.S. PATENT DOCUMENTS

| | | | |
|---|---|---|---|
| 2,960,728 A | * | 11/1960 | Beer .......................... C08J 9/28 264/53 |
| 5,495,935 A | | 3/1996 | Zabron et al. |
| 6,413,618 B1 | | 7/2002 | Parker et al. |
| 6,475,313 B1 | | 11/2002 | Peterson et al. |
| 6,511,926 B1 | | 1/2003 | Kauffman et al. |
| 6,591,560 B2 | | 7/2003 | Burke, III et al. |
| 6,649,248 B1 | | 11/2003 | Schneider et al. |
| 2003/0060110 A1 | | 3/2003 | Desai |
| 2009/0029097 A1 | | 1/2009 | Riddle et al. |

FOREIGN PATENT DOCUMENTS

| | | |
|---|---|---|
| CA | 2133522 | 4/1996 |
| EP | 1362695 B1 | 7/2006 |

OTHER PUBLICATIONS

Search Report for Corresponding CA Application No. 2,873,430, mailed Mar. 16, 2016. CA.

* cited by examiner

*Primary Examiner* — Stella Yi

(57) ABSTRACT

Described herein are methods for encapsulating a fiberglass substrate using a calendered film; along with products produced from same. The methods improve the efficiency of the manufacturing process and provide a product with improved performance characteristics.

15 Claims, 2 Drawing Sheets

METHODS FOR ENCAPSULATING A SUBSTRATE AND PRODUCTS PRODUCED FROM SAME

BACKGROUND

Conventional methods of manufacturing multilayer composites used in flooring products, including vinyl sheet flooring products, e.g., flooring tiles and planks, have numerous drawbacks, including, inter alia: (1) interaction of the encapsulating materials with the oven belt; (2) "ink blocking", which occurs when the ink printed on a particular layer sticks to the back side of the sheet when it is rolled up; and (3) poor durability and poor indentation recovery. Such flooring composites need to have long durability, including improved resistance to abrasion, indentation and staining, since the composites are directly exposed to constant abrasion, pressure and staining resulting from normal use. Embodiments of the present invention are directed to these and other ends.

SUMMARY

In some embodiments, the present invention provides a method for encapsulating a substrate comprising: applying a first calendered film layer to a first major surface of a substrate to form a composite comprising the calendered film layer and the substrate; and applying a foamable polymer formulation layer to said composite; wherein at least a portion of the substrate remains exposed after the first calendered film layer is applied to the first major surface of the substrate; and applying a second calendered film layer to said composite.

Some embodiments of the present invention provide a product prepared by any one of the methods described herein. Some embodiments provide a flooring product, e.g., tile, plank or sheet, described herein.

DETAILED DESCRIPTION

Figure 1:
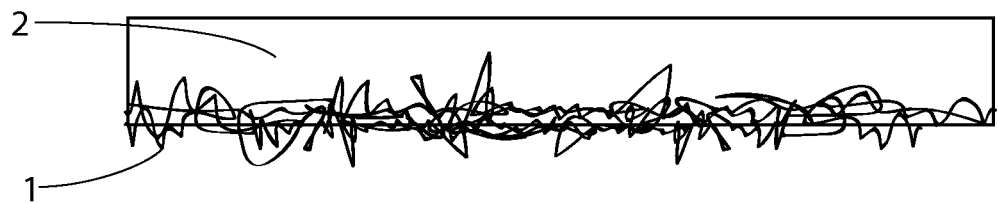
FIG. 1 depicts a composite prepared by an exemplary method of the present invention wherein a calendered film is applied to a substrate to partially encapsulate the substrate in the calendered film.
Figure 2:
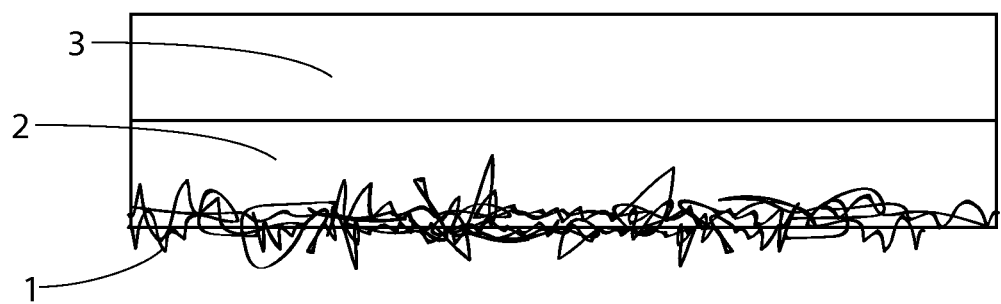
FIG. 2 depicts a composite prepared by an exemplary method of the present invention wherein a foamable polymer formulation has been applied to the calendered film layer side of the partially encapsulated substrate.
Figure 3:
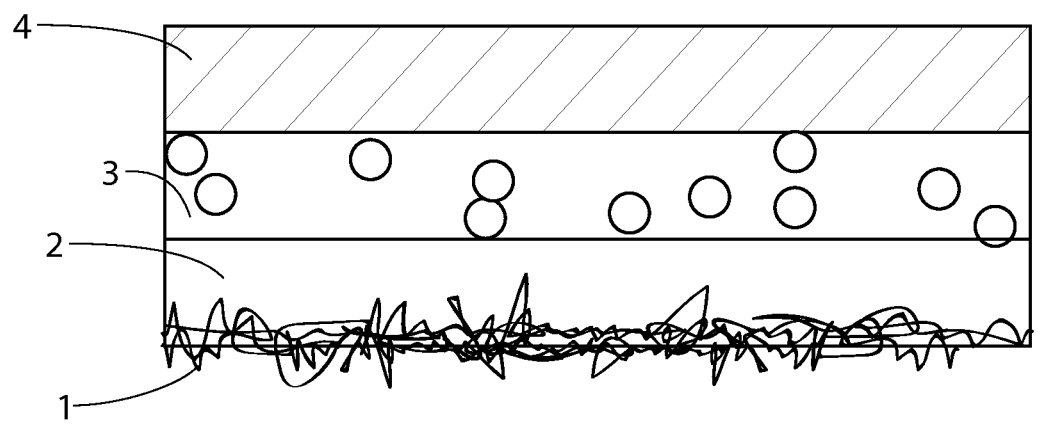
FIG. 3 depicts a composite prepared by an exemplary method of the present invention wherein a coating has been applied to the foamable polymer formulation layer after the foamable polymer formulation layer has been embossed.

As used herein, the terms "hot melt calendering" or "HMC" refer to a process of formulating a homogeneous mixture containing a resin and optionally a plasticizer, filler, stabilizer and a blowing agent, heating the mixture and sending it to a calendar where the mixture is applied in a precisely controlled thickness to a substrate.

As used herein, the terms "encapsulated" or "encapsulating" may be used interchangeably. As used herein the abbreviation "fpm" refers to feet per minute.

In some embodiments, the present invention provides method for encapsulating a substrate 1 comprising: applying a first calendered film 2 to a first major surface of a substrate 1 to form a composite, wherein at least a portion of the substrate 1 remains exposed after the first calendered film layer 2 is applied to the first major surface of the substrate 1; applying a foamable polymer formulation 3 to said composite; and applying a second calendered film 5 to said composite.

In some embodiments, the foamable polymer formulation layer 3 comprises a foamable plastisol. The foamable layer 3 applied on the first calendered film layer 2 can be gelled (solidified) by bringing the composite in contact with a heated drum having a surface temperature between about 280° F. and 310° F., and then optionally decorated with standard rotogravure ink compositions or other ink printing processes on top of the gelled surface.

In some embodiments, the methods further comprise applying a coating 4 to the embossed foamable polymer formulation layer of the composite. In some embodiments, the coating 4 is transparent. In some embodiments, the coating 4 is translucent. In some embodiments, the coating 4 comprises a vinyl plastisol.

Some embodiments further comprise the step of exposing the composite to heat. Other embodiments further comprise foaming the composite in an oven. In some embodiments, the composite is exposed to temperatures in excess of 250° F. to foam the applied foamable layer 3 and to cure the coating 5. In some embodiments, the composite with the foamable layer or after the coating is applied and cured is further process to emboss the composite.

In some embodiments, the second calendered film 5 is applied to a second major surface of the substrate, which is the other planar surface of the substrate away from the first calendered film layer 2. In some embodiments, the composite with the coating 4 applied thereto, prior to or after the foaming heat treatment, is rotated to upwardly expose the second major surface and then the second calendered film 5 is applied onto the second major surface.

In some embodiments, the first calendered film layer 2 adheres to the substrate 1 in the absence of an adhesive. In some embodiments, the second calendered film layer 5 adheres to the substrate 1 in the absence of an adhesive.

In some embodiments, the first calendered film layer 2 comprises a composition comprising a melt processable polymer formulation. In other embodiments, the second calendered film layer 5 comprises a composition comprising a melt processable polymer formulation. In some embodiments, the melt processable polymer formulation is selected from: polyvinyl chloride, polyethylene, polypropylene, polystyrene, polycarbonate, polyester, polyvinyl acetate, thermoplastic elastomer, e.g., acrylonitrile butadiene styrene, a copolymer thereof, and a combination of two or more thereof.

In some embodiments, the composition comprising a melt processable polymer formulation can be applied via melt calender equipment in widths limited only by equipment and substrate availability. In some embodiments, a melt processable polymer formulation composition is delivered as a molten extrudate to a three roll calender. In some embodiments, the melt processable polymer formulation composition is further softened in the three roll calender by the heated rolls. In some embodiments, the thickness of the calendered film is determined by the gap between the second roll and the third roll.

In some embodiments, the substrate 1 is preheated by a heater. In some embodiments, the calendered film is applied to the preheated substrate between the third roll and the conformable pressure roll to form a multilayered composite in which the melt processable polymer formulation composition forms a layer, having a substantially uniform thickness, adjacent to the substrate 1. In some embodiments, the conformable pressure roll deters air entrapment between the melt processable polymer formulation composition and the substrate 1.

In some embodiments, the melt processable composition is introduced as a film. In some embodiments, the film is subsequently melted or softened and applied to the substrate 1 with a calender, including a two roll calender, or heated drum and conformable pressure roll, such as a rubber roll.

In some embodiments, a film comprising a melt processable polymer formulation composition is introduced to a conformable rubber pressure roll and onto a heated drum in such a manner to eliminate entrapment of air between the film and drum. In some embodiments, the film is heated by the drum to melt the film or put it in a softened condition approaching melt. In some embodiments, the substrate 1 is preheated by a heater. In some embodiments, the film is then melt applied to the preheated substrate between a heated drum and a second rubber pressure roll to form a composite.

In some embodiments, the composite has a thickness of from about 40 mils to about 105 mils. In some embodiments, the composite has a thickness of from about 40 mils to about 75 mils.

In other embodiments, the first calendered layer 2 has a thickness of from about 10 mils to about 20 mils. In other embodiments, the first calendered layer 2 has a thickness of from about 12 mils to about 17 mils.

In further embodiments, the second calendered layer 5 has a thickness of from about 10 mils to about 40 mils. In yet other embodiments, the second calendered layer 5 has a thickness of about 23 mils. Yet other embodiments provide a second calendered layer 5 having a thickness of about 26 mils.

In some embodiments, the coating 4 has a thickness of from about 5 mils to about 15 mils. In some embodiments, the coating 4 has a thickness of about 10 mils. In other embodiments, the coating 4 has a thickness of 9.5 mils.

In some embodiments, the first calendered film layer 2 does not completely encapsulate or migrate through the substrate 1 such that some planar portion of the second major surface of the substrate 1 is exposed to receive the second film layer 5. In some embodiments, at least a portion of the first calendered film layer 2 protrudes through the second major surface of the substrate 1. In some embodiments, at least a portion of the second calendered film layer 5 is in contact with said first calendered film layer 2.

In some embodiments, the first calendered film layer 2 further comprises a filler. In some embodiments, the second calendered film layer 5 further comprises a filler. In some embodiments, the filler is selected from limestone, clay, talc, dolomite, and a combination of two or more thereof. In some embodiments, the filler comprises limestone.

In some embodiments, the first calendered film layer 2 is applied to the substrate 1 at a line speed of from about 50 to about 100 fpm. In some embodiments, the second calendered film layer 5 is applied to the substrate 1 at a line speed of from about 50 to about 100 fpm.

In some embodiments, the composition comprising a melt processable polymer formulation has a melting and calendaring requirements of 20-30 Nm at 301 F to 325 F. The melting and calendering is measured on a Torque Rheometer with fluxing between 260 F and 270 F In some embodiments, the specified calendering range corresponds to a temperature range of 350° F. to 410° F. In this range the melt composition bonds well to the substrate and it flows to conform well to the substrate while substantially maintaining a uniform thickness. In some embodiments, the applied hot melt composition cools rapidly on the substrate avoiding distortion of the substrate, though the melt temperature of the substrate may be similar to that of the hot melt composition which is applied. In some embodiments, the melt composition comprises a vinyl chloride polymer. In some embodiments, the melt composition comprises a vinyl chloride homopolymer.

In some embodiments, the substrate 1 is a non-woven fabric. In some embodiments the substrate 1 is produced from an inorganic substrate. In some embodiments, the substrate 1 comprises mineral wool, slag wool, rock wool, or a combination of two or more thereof. In some embodiment, the substate 1 comprises a polyester, e.g., polyethylene terephthalate fibers, or a mixture of polyester fiber and fiberglass.

In some embodiments, the substrate 1 comprises fiberglass. In some embodiments, the substrate 1 comprises a glass veil.

In some embodiments, the composite is embossed at a line speed of from about 40 fpm to about 140 fpm. In other embodiments, the foamable polymer formulation layer 3 is embossed at a line speed of about 140 fpm. In some embodiments, the foamable polymer formulation layer 3 is embossed with an ink comprising a high molecular weight resin.

In some embodiments, the first calendered film layer 2 further comprises a plasticizer. In some embodiments, the second calendered film layer 5 further comprises a plasticizer. In some embodiments, the plasticizer is a phthalate free plasticizer.

In some embodiments, the first calendered film layer 2 has a density of from about 25 g/m$^2$ to about 75 g/m$^2$. In some embodiments, the first calendered film layer 2 has a density of from about 35 g/m$^2$ to about 40 g/m$^2$. In some embodiments, the second calendered film layer 5 has a density of from about 25 g/m$^2$ to about 75 g/m$^2$. In some embodiments, the second calendered film layer 5 has a density of from about 35 g/m$^2$ to about 40 g/m$^2$.

In some embodiments, the first calendered film layer 2 is applied to the substrate 1 at a pressure of from about 10 pli to about 200 pli. In some embodiments, the first calendered film layer 2 is applied to the substrate 1 at a pressure of from about 30 pli to about 200 pli. In some embodiments, the first calendered film layer 2 is applied to the substrate 1 at a pressure of from about 10 pli to about 100 pli. In some embodiments, the first calendered film layer 2 is applied to the substrate 1 at a pressure of about 40 pli.

In some embodiments, the second calendered film layer 5 is applied to the substrate 1 at a pressure of from about 10 pli to about 200 pli. In some embodiments, the second calendered film layer 5 is applied to the substrate 1 at a pressure of from about 30 pli to about 200 pli. In some embodiments, the second calendered film layer 5 is applied to the substrate 1 at a pressure of from about 10 pli to about 100 pli. In some embodiments, the second calendered film layer 5 is applied to the substrate 1 at a pressure of about 40 pli.

Some embodiments of the present invention provide a flooring product comprising the product of any one of the methods described herein.

Some embodiments provide a method for preparing a multilayer composite comprising: providing a substrate 1 having a first and a second major surface; applying a first calendered film 2 to the first major surface of the substrate 1; applying a foamable polymer formulation 3 to said first calendered film layer 2; wherein at least a portion of the substrate 1 remains exposed after the first calendered film 2 is applied to the first major surface of the substrate 1; and applying a second calendered film 5 to the second major surface of the substrate 1.

Figure 4:
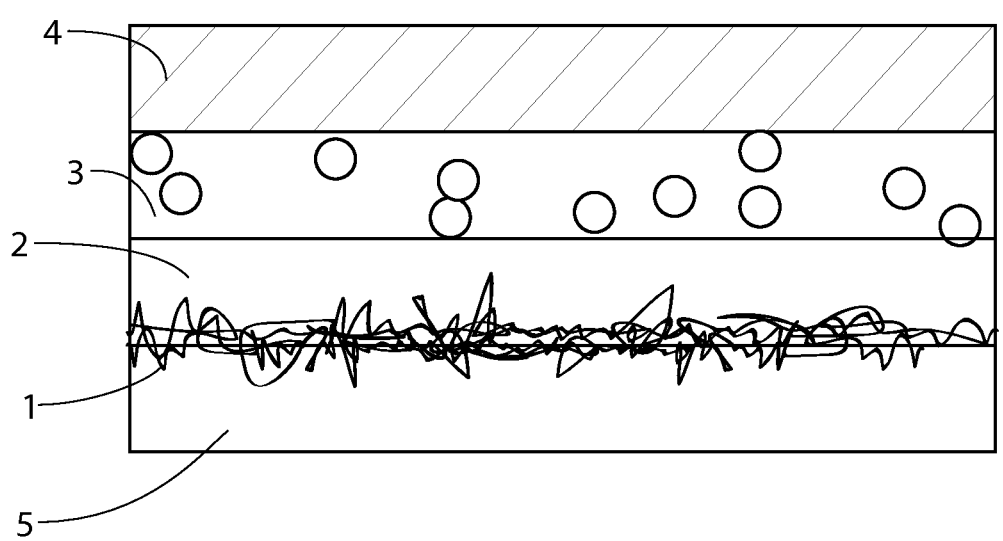
FIG. 4 depicts a composite prepared by an exemplary method of the present invention wherein a second calendered film is applied to the substrate to fully encapsulate the substrate.

Some embodiments provide a product produced by any one of the methods described herein. An exemplary composite flooring sheet product is illustrated in FIG. 4. The composite sheet has a fiberglass veil encapsulated between two HMC layers. The foamed resin layer is also protected with a coating layer, such as polyvinyl chloride film layer produced from plastisol. The resulting composite sheet is dimensionally stable and not impacted by ambient moisture. When the composite sheet is used as a flooring, the dimensionally stable structure can be installed without using an adhesive, unlike a conventional flooring sheet with a felt backing. In addition, the composite sheet with the HMC layers provides improved performance and durability compared to conventional vinyl flooring composite sheet.

The invention will be described in greater detail by way of specific examples. The following examples are offered for illustrative purposes and are not intended to limit the invention in any manner. Those skilled in the art will readily recognize a variety of noncritical parameters which can be changed or modified to yield essentially the same results.

EXAMPLES

Example 1

Described below in Table 1 are exemplary compositions which comprise the first and/or second calendered film layers.

TABLE 1

| Ingredients | I | II | III |
|---|---|---|---|
| | | Wt. % | |
| Limestone | 63.00 | 63.00 | 63.00 |
| Polyvinyl chloride homopolymer resin | 25.73 | 25.86 | 25.60 |
| Dioctyl terephthalate | 9.00 | 9.20 | 8.92 |
| Processing aid | 0.21 | 0.00 | 0.41 |
| Epoxidized soy bean oil | 0.82 | 0.82 | 0.82 |
| Calcium zinc phosphate | 0.50 | 0.50 | 0.50 |
| Calcium stearate | 0.74 | 0.75 | 0.75 |

The above HMC formulations are compounded in a high intensity mixer, and then fed into a calendar (top roll 340° F. and transfer roll 350° F.) at a mixture temperature of 380° F. The HMC is directly melt coated onto a fiberglass veil of 20 mils thickness to form a 20 mils thick HMC layer. A 10 mils foamable vinyl plastiol composition (2:1 blow ratio) is coated with a reverse roll coater on the HMC side of the composite. The coated vinyl plastisol is gelled by bringing it in contact with a hot drum at 300° F. The foamable plastisol composition contains PVC homopolymer foam dispersion resin—K65 31.5%, PVC homopolymer blending resin 25.7%, limestone filler 12.6%, $TiO_2$ 3.2%, activated blowing agent 0.9%, dioctyl terephthalate plasticizer 22.6%, hydrocarbon diluent 2.8% and epoxidized soya oil 0.7%. The gelled foamable layer is subsequently printed with standard rotogravure ink compositions in a selected design using inhibitor and non-inhibitor compositions. A 10 mils thick transparent vinyl plastisol composition is coated onto this printed composite by reverse roll coating, and the entire composite is heated in an air impingement oven such that the surface temperature of the composite reached 370° F., thereby expanding the foamable plastisol layer to produce a chemically embossed flooring structure. The resulting composite is flipped over and a 20 mil thick second layer of the HMC formulation is applied on the exposed side of the fiberglass veil. The thicknesses of the final composites are 60 mils, 70 mils and 80 mils, respectively.

Example 2

Appliance Foot Drag Test

The purpose of the Appliance Foot Drag Test is to determine a flooring product's resistance to tearing when an appliance foot is dragged or pushed across its surface. Samples are subjected to one (1) pass of a refrigerator foot mounted on an aluminum base and attached to a slide apparatus at a given weight. The foot used is a standard refrigerator leveling foot that has six sides with rounded corners. The maximum dimension is 1.5 inches from a point at the juncture of any two adjacent sides through the center to the opposite point.

Four (4) 5-inch wide×20-inch long specimens of a various flooring products are prepared, with the 20-inch length in the machine direction. The flooring products are adhered to a subflooring material according to appropriate installation procedure. A 2-inch strip of double-faced cloth carpet tape is placed on the back of each specimen over its entire length, in the center of the specimen.

A slide apparatus moves along the surface of the specimen at the rate of 30 inches in five seconds. The specimens are affixed to the slide table so that refrigerator foot will slide down the middle of the specimen. The refrigerator foot bar is secured to slide wells. The weight plates are lowered onto the specimen. The weight may be allowed to rest on the specimen for 20 seconds before start of the test.

Additional weight is added onto the top of the weight plates. The testing apparatus is activated and a single pass of the refrigerator foot is made down the length of the specimen. The weights are removed from the apparatus and refrigerator foot is moved back to the starting point.

The specimen is inspected for any failure, i.e., any break in wear surface. Weight is added or subtracted according to results. The process is repeated until the specimen tears. The weight at which tearing takes place is noted, and this represents the reported value.

The data described in Table 2 (below) demonstrates that flooring products prepared using an exemplary method of the present invention significantly outperformed similarly structured and constituted flooring products prepared using conventional methods of preparation, in an Appliance Foot Drag Test.

TABLE 2

| | I | II | III | Comp. Ex. I | Comp. Ex. II | Comp. Ex. III |
|---|---|---|---|---|---|---|
| | | | | Pounds | | |
| Wt. Required to Tear Specimen | 163 | 211 | 249 | 103 | 68 | 93 |

Comp. Ex I is a residential vinyl flooring sheet of a 67 mils thickness (IVC Level Plus)
Comp. Ex II is a residential vinyl flooring sheet of a 60 mils thickness (IVC Spectrum Choice)
Comp. Ex III is is a residential vinyl flooring sheet of a 70 mils thickness (Tarkett Fresh Start)

Example 3

Residual Indentation Test

The purpose of the indent test is to obtain a quantitative measure of the resistance of a flooring product to indentation. Samples are subjected to the prescribed pressure in pounds per square inch for a given amount of time. The depth of indentation and amount of residual indentation are recorded.

The specimens are conditioned for 24 hours at 73.4° F. and relative humidity of 50%. An indentation machine is used to test the samples. A specimen at least 2 in.×4 in. is used. No test should be made within ½ inch of any edge of the specimen. The thickness of each location to be indented on the specimen is measured and recorded. The specimen is then placed flat on the base plate of the indentation machine. An indentor foot (having a flat circular bottom of 0.282 inch diameter) on the indentation machine is lowered gently without impact until it contacts the surface of the specimen where the thickness measurement was made, applying an initial load of one pound. The dial indicator is adjusted to zero and an additional 120 pound load applied to the specimen within one or two seconds.

At the end of 10 minutes of application of the load, the indentation is read from the dial indicator, the load removed and the value recorded to the nearest 0.001 inch. Upon removal from the indentation machine, the specimen is laid flat for 24 hours and a thickness measurement is made at the same spot where the original thickness was measured and the amount of residual indentation is calculated by subtracting this measurement from the original thickness. Three determinations are made for each specimen. Thus, a residual indent value of less than 5 mils indicates that residual indentation of the sample was less than 0.005 inches.

The data described in Table 3 (below) demonstrates that flooring products prepared using an exemplary method of the present invention significantly outperformed similarly structured and constituted flooring products prepared using conventional methods of preparation, in a Residual Indentation Test.

TABLE 3

|  | I | II | III | Comp. Ex. I | Comp. Ex. II | Comp. Ex. III |
| --- | --- | --- | --- | --- | --- | --- |
| Residual Indentation (mils) | 2 | 3.66 | 3 | 5.33 | 5.33 | 5 |

It is intended that any patents, patent applications or printed publications, including books, mentioned in this patent document be hereby incorporated by reference in their entirety.

As those skilled in the art will appreciate, numerous changes and modifications may be made to the embodiments described herein, without departing from the spirit of the invention. It is intended that all such variations fall within the scope of the invention.

The invention claimed is:

1. A method for preparing a flooring product comprising an encapsulated substrate comprising:
   providing a substrate having a first and a second major surface;
   applying a first calendered film to a first major surface of the substrate to form a composite, wherein at least a portion of the second major surface of the substrate remains exposed after the first calendered film is applied to the first major surface of the substrate;
   applying a foamable polymer formulation to said composite; and
   applying a second calendered film to said composite,
   wherein at least a portion of the first calendered film protrudes through the second major surface of the substrate.

2. The method of claim 1, wherein the second calendered film is applied to the second major surface of the substrate.

3. The method of claim 1 wherein the first calendered film adheres to the substrate in the absence of an adhesive.

4. The method of claim 1, wherein the second calendered film adheres to the substrate in the absence or an adhesive.

5. The method of claim 1, wherein the first calendered film comprises a composition comprising a melt processable resin selected from: polyvinyl chloride, polyethylene, polypropylene, polystyrene, polycarbonate, polyester, rubber, polyvinyl acetate, acrylonitrile butadiene styrene, a copolymer thereof, and a combination of two or more thereof.

6. The method of claim 1, wherein the second calendered film comprises a composition comprising a melt processable polymer selected from: polyvinyl chloride, polyethylene, polypropylene, polystyrene, polycarbonate, polyester, rubber, polyvinyl acetate, acrylonitrile butadiene styrene, a copolymer thereof, and a combination of two or more thereof.

7. The method of claim 1, wherein the first calendered film has a thickness of from about 10 mils to about 20 mils.

8. The method of claim 1, wherein the first calendered film has a thickness of from about 10 mils to about 30 mils.

9. The method of claim 1, wherein at least a portion of the second calendered film is in contact with said first calendered film.

10. The method of claim 1, wherein the first calendered film or second calendered film further comprises a filler selected from limestone, clay, talc, dolomite, and a combination of two or more thereof.

11. The method of claim 1, wherein the first calendered film is applied to the substrate at a line speed of from about 40 to about 160 fpm.

12. The method of claim 1, wherein the second calendered film is applied to the substrate at a line speed of from about 50 to about 100 fpm.

13. The method of claim 1, wherein the substrate is a glass veil.

14. A method for preparing a multilayer composite comprising:
   providing a substrate having a first and a second major surface:
   applying a first calendered film to the first major surface of the substrate;
   applying a foamable polymer formulation to said first calendered film layer;
   wherein at least a portion of the substrate remains exposed after the first calendered film is applied to the first major surface of the substrate, and
   wherein at least a portion of the first calendered film protrudes through the second major surface of the substrate; and
   applying a second calendered film to the second major surface of the substrate.

15. The method of claim 14, wherein the multilayer composite is suitable for use as a flooring product.

* * * * *